United States Patent
Nakahama et al.

(10) Patent No.: US 9,825,344 B2
(45) Date of Patent: Nov. 21, 2017

(54) HEAT GENERATING ELEMENT HOUSING DEVICE

(71) Applicant: KABUSHIKI KAISHA TOSHIBA, Minato-ku (JP)

(72) Inventors: Takafumi Nakahama, Fuchu (JP); Kenya Kurokawa, Fuchu (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 155 days.

(21) Appl. No.: 14/556,875

(22) Filed: Dec. 1, 2014

(65) Prior Publication Data
US 2015/0162651 A1 Jun. 11, 2015

(30) Foreign Application Priority Data
Dec. 11, 2013 (JP) .................. 2013-255926

(51) Int. Cl.
| | | |
|---|---|---|
| *H01M 10/50* | (2006.01) | |
| *H01M 10/6551* | (2014.01) | |
| *H01M 10/6563* | (2014.01) | |
| *H01M 10/647* | (2014.01) | |
| *H01M 10/6567* | (2014.01) | |

(Continued)

(52) U.S. Cl.
CPC ..... *H01M 10/6551* (2015.04); *H01M 10/613* (2015.04); *H01M 10/647* (2015.04); *H01M 10/6562* (2015.04); *H01M 10/6563* (2015.04); *H01M 10/6567* (2015.04); *H01M 2/1016* (2013.01); *H01M 10/617* (2015.04); *H01M 10/6556* (2015.04)

(58) Field of Classification Search
CPC ........... H01M 10/6563; H01M 10/647; H01M 10/6567; H01M 10/6551; H01M 10/6562; H01M 10/613; H01M 10/617; H01M 2/1016; H01M 10/6556
USPC ...................................... 429/120
See application file for complete search history.

(56) References Cited

U.S. PATENT DOCUMENTS

| | | | |
|---|---|---|---|
| 6,936,372 B1 | 8/2005 | Jagota et al. | |
| 2013/0017428 A1* | 1/2013 | Han ............ | H01M 2/1077 |
| | | | 429/99 |

FOREIGN PATENT DOCUMENTS

| | | | |
|---|---|---|---|
| CN | 101808496 A | * | 8/2010 |
| CN | 101808496 B | * | 12/2011 |

(Continued)

OTHER PUBLICATIONS

Office Action dated Nov. 18, 2015 in Korean Patent Application No. 10-2014-0177343.

(Continued)

*Primary Examiner* — Gary Harris
(74) *Attorney, Agent, or Firm* — Oblon, McClelland, Maier & Neustadt, L.L.P.

(57) ABSTRACT

A heat generating element housing device includes a first side surface, a second side surface, a first shelf plate, second shelf plates, module cases, and highly heat conductive members. The module cases are in a substantially rectangular parallelepiped shape and are fixed to the second shelf plates at the respective heights, with their longitudinal direction directed along a flow direction of the air. Each of the highly heat conductive members is fixed, with its heat transfer surface being in contact with at least one of the longitudinal side surfaces of the module case and with a side portion of the heat transfer surface being in contact with the second shelf plate.

15 Claims, 6 Drawing Sheets

(51) Int. Cl.
*H01M 10/613* (2014.01)
*H01M 10/6562* (2014.01)
*H01M 10/617* (2014.01)
*H01M 2/10* (2006.01)
*H01M 10/6556* (2014.01)

(56) References Cited

FOREIGN PATENT DOCUMENTS

| | | |
|---|---|---|
| EP | 2 660 926 A2 | 11/2013 |
| JP | 2009-238389 A | 10/2009 |
| JP | 2012-84486 | 4/2012 |
| JP | 2013-222603 A | 10/2013 |
| JP | 2014-135173 | 7/2014 |
| WO | WO 2013/157560 A1 | 10/2013 |

OTHER PUBLICATIONS

Extended European Search Report dated May 4, 2015 in Patent Application No. 14196276.1.
Japanese Office Action dated Jun. 13, 2017, issued in Japanese Patent Application No. 2013-255926 (with English translation).

* cited by examiner

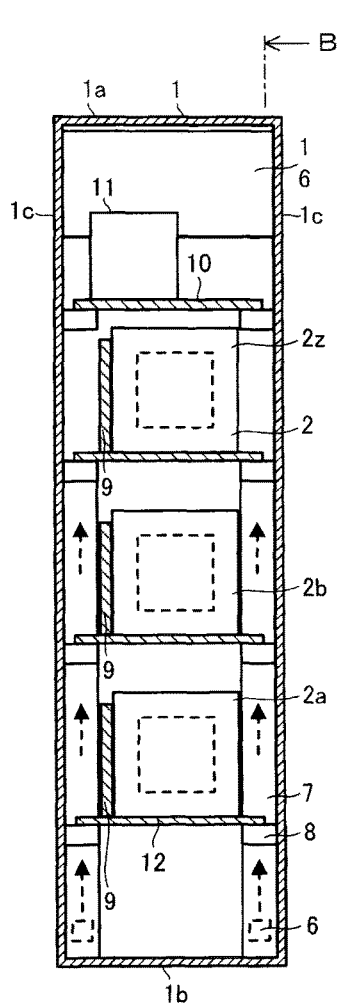
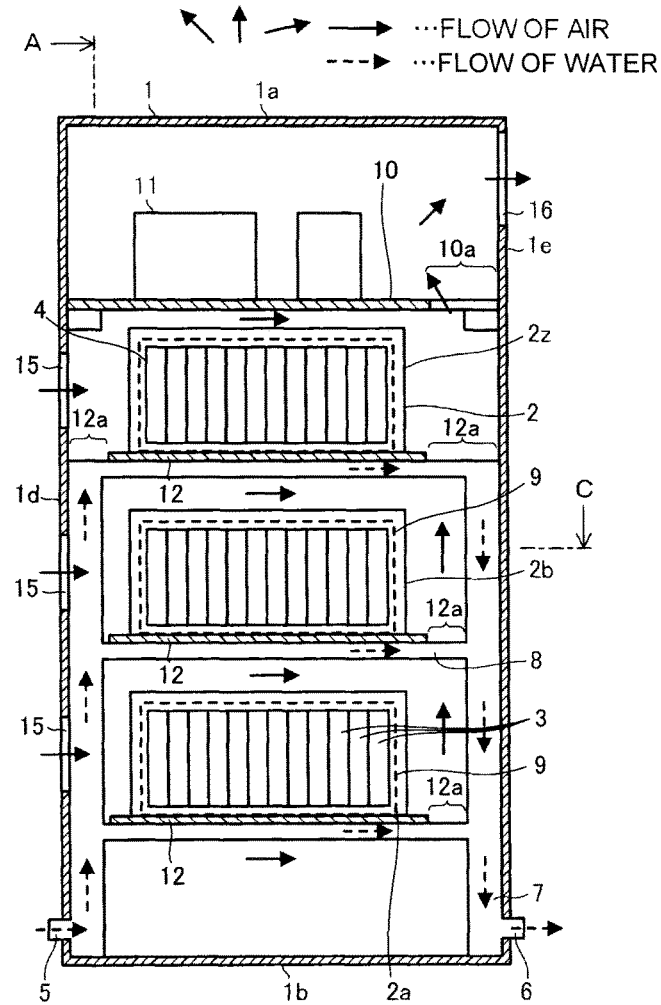
FIG.6A  FIG.6B
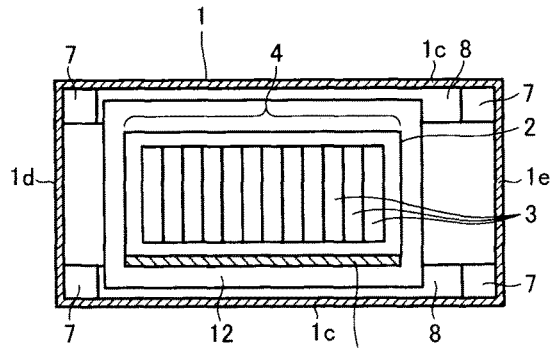
FIG.6C

HEAT GENERATING ELEMENT HOUSING DEVICE

CROSS REFERENCE TO RELATED APPLICATION

This application is based upon and claims the benefit of priority from the prior Japanese Patent Application No. 2013-255926, filed on Dec. 11, 2013; the entire contents of which are incorporated herein by reference.

FIELD

Embodiments described herein relate generally to a heat generating element housing device.

BACKGROUND

A power storage device such as, for example, a battery is a heat generating element, and in accordance with an increase of its power storage capacity, it generates a larger amount of heat, and therefore improvement of cooling efficiency of a heat generating element housing device which houses the heat generating element is now desired.

A structure in which a plurality of batteries are connected is adopted in order to increase the power storage capacity, and this structure is called a power storage module.

Generally, a casing of the heat generating element housing device which houses the heat generating elements has a cooling structure in which an air inlet is disposed in a lower portion and an exhaust port is disposed in an upper portion, and power storage modules are stacked in tiers between the air inlet and the exhaust port.

However, in the conventional casing cooling structure of the heat generating element housing device, the air led from the air inlet is warmed while sequentially passing from the lower portion through spaces between the power storage modules stacked in tiers.

Further, on each tier, the air circulates by convection at a position of the power storage module, which involves problems that not only a temperature difference occurs between the tiers but also a temperature difference (temperature variation) occurs between the air inlet side and the exhaust port side even in the power storage module on the same tier.

The embodiments have an object to provide a heat generating element housing device that is capable of reducing a temperature difference (temperature variation) between an air inlet side and an exhaust port side of a module that generates heat.

BRIEF DESCRIPTION OF THE DRAWINGS

FIG. 6A is a front sectional view illustrating the structure of a power storage device of a sixth embodiment.

FIG. 6B is a side sectional view of the power storage device in FIG. 6A seen in a B direction.

FIG. 6C is a plane sectional view of the power storage device in FIG. 6B seen in a C direction.

DETAILED DESCRIPTION

A heat generating element housing device of one embodiment includes: a casing including a first (front) side surface, a second (rear) side surface, a first shelf plate, second shelf plates, and so on; module cases each containing a group of batteries being heat generating elements; and highly heat conductive members.

In the first side surface, an air inlet for leading the outside air is provided.

The second side surface is disposed to face the first side surface, and has an exhaust port provided in its upper portion.

The first shelf plate is disposed at a position lower than the exhaust port and has an opening for sending the air from under to the exhaust port.

The second shelf plates have a heat transfer property.

The second shelf plates are disposed at positions higher than the air inlet to be arranged at predetermined intervals in a height direction, and each have an opening for sending up the air fed from the air inlet.

The module cases are in a substantially rectangular parallelepiped shape and each include side surfaces having longitudinal side portions.

The module cases are fixed to the second shelf plates at the respective heights, with their longitudinal direction being directed along a flow direction of the air, and each house the group of the heat generating elements.

The highly heat conductive members are each fixed, with its heat transfer surface being in contact with at least one of the longitudinal side surfaces of the module case and with a side portion of the heat transfer surface being in contact with the second shelf plate.

Hereinafter, embodiments will be described in detail with reference to the drawings.

First Embodiment

Figure 1A:
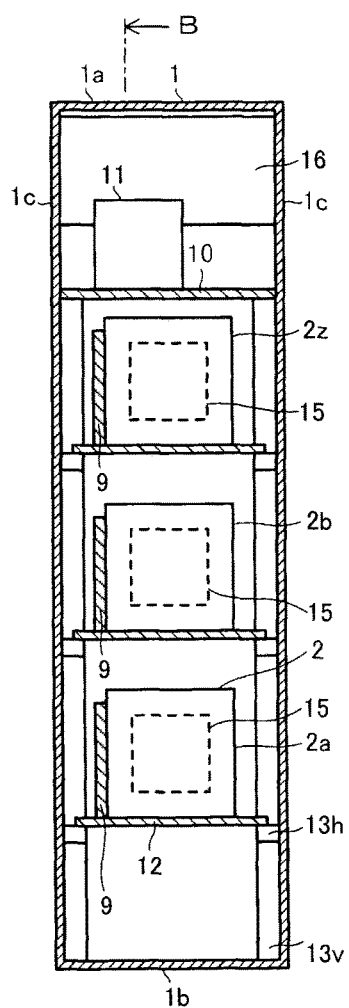
FIG. 1A is a front sectional view illustrating the structure of a power storage device of a first embodiment.
Figure 1B:
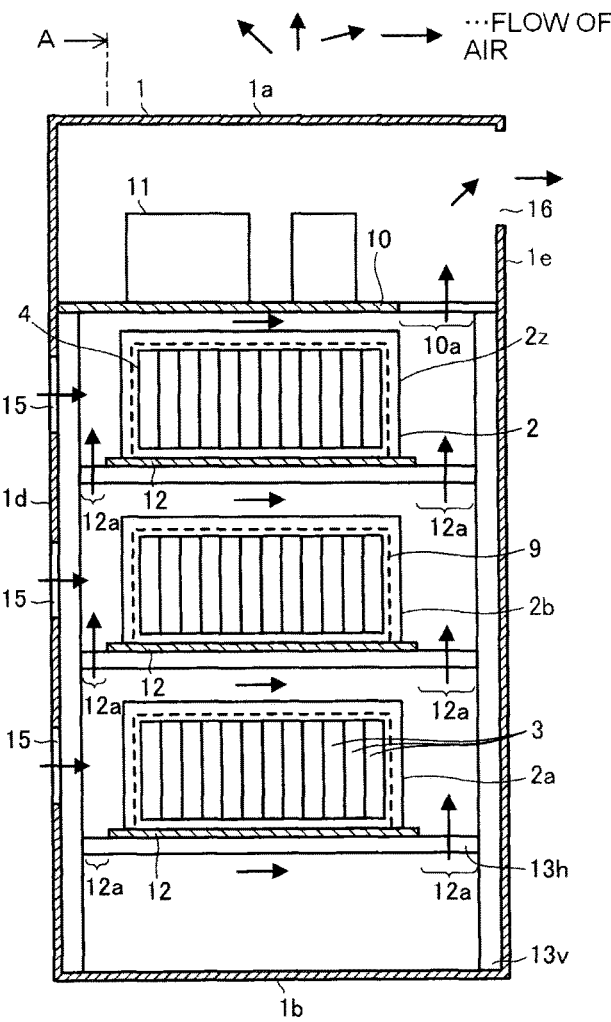
FIG. 1B is a side sectional view of the power storage device in FIG. 1A seen in a B direction.

FIG. 1A and FIG. 1B are views illustrating the structure of a power storage device of a first embodiment.

As illustrated in FIG. 1A and FIG. 1B, the power storage device of this embodiment includes: module cases 2 as heat generating modules each housing (storing) a battery group 4 as the heat generating element group; support members such as horizontal structural members 13*h* and vertical structural members 13*v* supporting (fixing) the module cases 2 so that the plural module cases 2 are disposed in tiers; a top plate 10 as the first shelf plate, shelf plates 12 as the second shelf plates, heat transfer plates 9 as the highly heat conductive members; and a casing 1 housing these members.

That is, this power storage device is a heat generating element housing device which houses the heat generating elements.

The module cases 2 are in a substantially rectangular parallelepiped shape and each include side surfaces having longitudinal side portions.

The module cases 2 are mounted and fixed on the shelf plates 12 at the respective heights, with their longitudinal direction directed along a flow direction of gas such as the air.

Predetermined intervals are arranged in a vertical direction between the individual (up and down) module cases 2 so as to enable air ventilation.

Among the module cases 2, the lowest one is referred to as a lowermost module case 2a, a module case on its upper tier is referred to as a second-tier module case 2b, and a highest one is referred to as an uppermost module case 2z.

In each of the module cases 2, a plurality of batteries 3 as the heat generating elements are arranged in a line in a horizontal direction to form the battery group 4.

The batteries 3 are heat generating elements in a substantially rectangular parallelepiped shape and are disposed so that their terminals are directed sideways.

When the plural batteries 3 are thus arranged with their surfaces being in close contact with one another to form the battery group 4, temperature of the battery group 4 becomes higher than when the batteries 3 each stand alone.

The temperature of the batteries 3 becomes higher toward a center in the arrangement direction.

The batteries 3 are provided with electrodes (terminals), but the direction in which the terminal of each of the batteries is directed is appropriately changed so as to prevent the electrodes from obstructing heat transfer to the module cases 2 and the heat transfer plates 9.

Since the battery groups 4 generate heat in the module cases 2 to increase the temperature, heat radiation to the outside is necessary.

When the arrangement direction in which the batteries 3 are stacked is from a front surface toward a rear surface of the casing 1, the temperature of the battery group 4 is high on a front side and is low on a rear side.

The casing 1 includes an upper surface 1a, a bottom surface 1b facing the upper surface 1a, side surfaces 1c connecting edges of the upper surface 1a and the bottom surface 1b, a front side surface 1d as the first side surface, and a rear side surface 1e as the second side surface.

The front side surface 1d is disposed to face the rear side surface 1e.

In the front side surface 1d of the casing 1, air inlets 15 are provided at positions corresponding to the module cases 2 on the respective tiers.

The air inlets 15 are intended to lead (feed) the outside air into the casing 1.

In an upper portion of the casing 1, in more detail, in an upper portion of the rear side surface 1e, an exhaust port 16 is provided.

In an upper portion of the casing 1, the top plate 10 as the first shelf plate is provided.

The top plate 10 is provided at a position lower than the exhaust port 16.

On the top plate 10, a control component 11 for controlling outputs of the many batteries 3 is mounted. On a side of the top plate 10, an opening 10a for sending the air from under to the exhaust port 16 is provided.

The opening 10a is provided on a side close to the rear side surface 1e.

In the casing 1, the shelf plates 12 as the second shelf plates are provided.

The shelf plates 12 are disposed at positions higher than the respective air inlets 15 to be arranged at predetermined intervals in a height direction.

The shelf plates 12 are metal plates such as, for example, aluminum plates and have a high heat transfer property.

On sides of the shelf plates 12, openings 12a being gaps for sending up the air fed from the air inlets 15 are provided.

The openings 12a are provided at positions close to the front side surface 1d and at positions close to the rear side surface 1e.

The openings 12a on the rear side are made wider than the openings 12a on the front side in consideration of the flow of the air.

The vertical structural members 13v are disposed so as to stand vertically, one per each corner of the casing 1.

The horizontal structural members 13h are places where to mount the respective shelf plates 12, and are disposed at predetermined intervals in the height direction to be fixed to the vertical structural members 13v and the side surfaces 1c.

The heat transfer plates 9 each have a heat transfer surface, and the heat transfer plates 9 are fixed, with their heat transfer surfaces being in contact with the side surfaces of the respective module cases 2.

Further, the heat transfer plates 9 are fixed, with their edge portions (side portions) being in contact with the shelf plates 12.

Though the heat transfer plates 9 are disposed on the side surfaces of the module cases 2 in this example, it should be noted that the heat transfer plates 9 may have other alternative structures, for example, each of the heat transfer plates 9 is formed as a plate member bent at a right angle along its side portion so as to have two surfaces and is disposed so as to be in contact with an upper surface and the side surface of the module case 2, or is formed as a plate member having three surfaces and is disposed so as to surround the module case 2.

That is, it is only necessary that the heat transfer surface of the heat transfer plate 9 is in contact with at least one of the longitudinal side surfaces of the module case 2.

The operation of the power storage device of the first embodiment will be described.

In this first embodiment, the casing 1 has the air inlets 15 disposed in the front side surface 1d and the exhaust port 16 disposed in the upper portion of the rear side surface 1e opposite the air inlets 16. The top plate 10 having the opening on the exhaust port 16 side is disposed above the uppermost module case 2z. In the front side surface 1d, the air inlets 15 are provided at the positions corresponding to the respective module cases 2a. The heat transfer plates 9 high in heat conductivity are fixed, with their heat transfer surfaces being in contact with the side surfaces of the respective module cases 2 and with their sides being in contact with the shelf plates 12.

With this structure, a heat flow from the side surface of each of the module cases 2 is diffused to the heat transfer plate 9.

Accordingly, temperature variation depending on the position in the arrangement direction of the batteries 3 housed in each of the module cases 2 (in this case, the longitudinal direction of the case) becomes small.

Further, since the heat of the module cases 2 is received by the surfaces of the heat transfer plates 9 to be transferred to the shelf plates 2, a heat radiation area to the air becomes large.

Consequently, an overall heat transfer coefficient from the batteries 3 to the air becomes large, which can reduce the temperature of the batteries 3.

(Flow of Air)

The air fed into the casing 1 from the plural air inlets 15 provided in the front side surface 1d of the casing 1 branches off into horizontal flow paths each surrounded by the module case 2 on each tier, the shelf plate 12, and the side surfaces 1c, and into a vertical flow path on the front side surface 1d side (air inlet 15 side) to flow rearward and upward.

When the air passes in the horizontal flow paths, bottom surfaces of the respective module cases 2 are cooled.

Thereafter, the air flows toward the rear side surface 1e (toward the exhaust port 16) and to the vertical flow path in the rear portion and is discharged from the exhaust port 16 via the openings 10a.

Further, the air passing in the vertical flow path closer to the air inlets 15 of the front side surface 1d branches off at the positions of the module cases 2 on the respective tiers into upward flows and the flows to the horizontal flow paths being the flow paths between the module cases 2.

The air passing in the horizontal flow paths flows rearward, and when entering the vertical flow path on the exhaust port 16 side, rises along this flow path to be discharged from the exhaust port 16.

When the temperature of the air becomes high due to the heat radiation from the module cases 2 on the respective tiers, a tunnel effect of the vertical flow path on the exhaust port 16 side improves, so that the air passes in the horizontal flow paths between the module cases 2 to flow toward the rear side surface 1e and rises along the vertical flow path to smoothly flow to the exhaust port 16.

Since the plural air inlets 15 are provided in the front side surface 1d, an upstream side and a downstream side of the vertical flow path on the front side surface 1d side have almost the same temperature as the temperature of the fed air.

Consequently, among the module cases 2, there is almost no temperature difference of the air flowing into the horizontal flow paths.

Consequently, the module cases 2 on the respective tiers are cooled by the air having almost uniform temperature, which can reduce the temperature difference between the upper and lower module cases 2, that is, temperature variation depending on the height position of the module cases 2.

As described above, according to this first embodiment, the heat transfer plates 9 high in heat conductivity is fixed, with their heat transfer surfaces being in contact with the side surfaces of the module cases 2 and with the sides of the heat transfer plates 9 being in contact with the shelf plates 12, so that the heat flow from the side surface of each of the module cases 2 is diffused to the heat transfer plate 9, which reduces the temperature variation depending on the position in the arrangement direction of the batteries 3 housed in each of the module cases 2 (in this case, the direction from the front side toward the rear side of the casing 1).

Further, since the heat is transferred through the heat transfer plates 9 to the shelf plates 12, the heat radiation area becomes large and the overall heat transfer coefficient from the batteries 3 to the air becomes large, which can also reduce the temperature of the batteries 3 themselves.

As a result, it is possible to reduce the temperature difference (temperature variation) between the air inlet 15 side and the exhaust port 16 side of each of the module cases 2 being the power storage modules.

Further, the air inlets 15 are provided in the front side surface 1d at the positions corresponding to the respective module cases 2, so that, in the horizontal flow paths, flowability of the air fed into the casing 1 from the air inlets 15 is enhanced while the air is brought into contact with the surfaces of the module cases 2, which makes it possible to almost uniformly cool the module cases 2 and accordingly reduce the temperature difference (temperature variation) of the module cases 2 depending on their up and down positions in the casing 1.

Second Embodiment

Subsequently, a power storage device of a second embodiment will be described with reference to FIG. 2A and FIG. 2B.

Note that the same structures as those of the above-described first embodiment (structures illustrated in FIG. 1A and FIG. 1B) will be denoted by the same reference signs, and description thereof will be omitted.

Figure 2A:
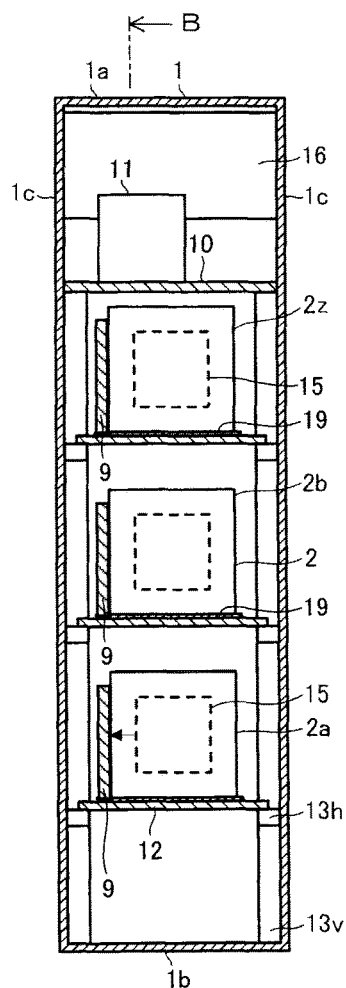
FIG. 2A is a front sectional view illustrating the structure of a power storage device of a second embodiment.
Figure 2B:
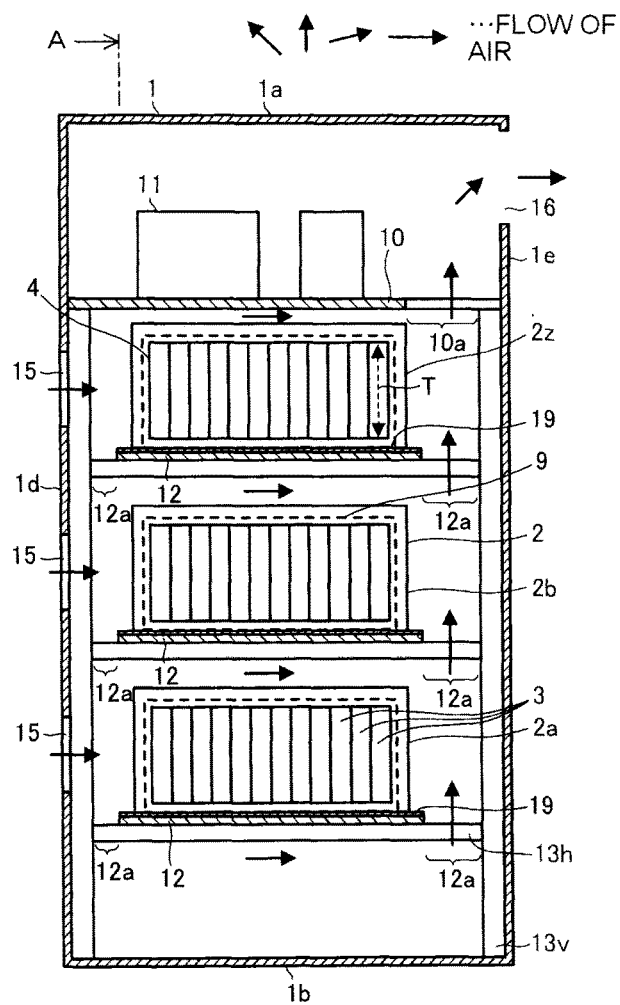
FIG. 2B is a side sectional view of the power storage device in FIG. 2A seen in a B direction.

As illustrated in FIG. 2A and FIG. 2B, in the power storage device of the second embodiment, a thickness direction T of batteries 3 is directed in a vertical direction, and heat transfer sheets 19 high in heat conductivity are each interposed between a shelf plate 12 and a module case 2.

The heat transfer sheets 19 are, for example, sheet members having a heat transfer property such as, for example, aluminum foil sheets or copper foil sheets.

In the second embodiment, since the heat transfer sheets 19 high in heat conductivity are each interposed between the module case 2 and the shelf plate 12, a heat flow from each of the module cases 2 housing a heat generating element group 4 is diffused also to the heat transfer sheet 19 and is radiated to the shelf plate 12, a horizontal structural member 13h, and vertical structural members 13v through the heat transfer sheet 19.

Consequently, an effective heat radiation area from each of the module cases 2 increases.

As described above, according to this second embodiment, not only the effects of the first embodiment are obtained but also the effective heat radiation area from each of the module cases 2 increases because the heat transfer sheets 19 high in heat conductivity are each interposed between the module case 2 and the shelf plates 12, and accordingly the heat flow from each of the module cases 2 is radiated to the shelf plate 12, the horizontal structural member 13h, and the vertical structural members 13v through the heat transfer sheet 19, which makes it possible to reduce the temperature of the batteries 3 housed in the module cases 2.

Third Embodiment

Subsequently, a power storage device of a third embodiment will be described with reference to FIG. 3A and FIG. 3B.

Note that the same structures as those of the above-descried first embodiment (structures illustrated in FIG. 1A and FIG. 1B) will be denoted by the same reference signs and description thereof will be omitted.

Figure 3A:
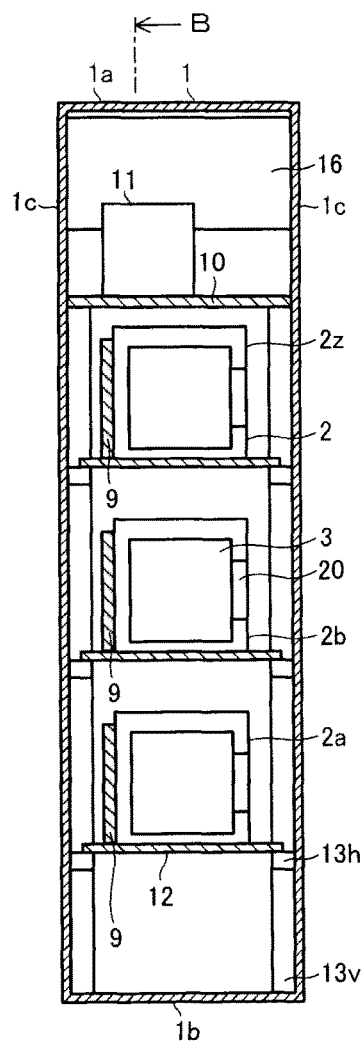
FIG. 3A is a front sectional view illustrating the structure of a power storage device of a third embodiment.
Figure 3B:
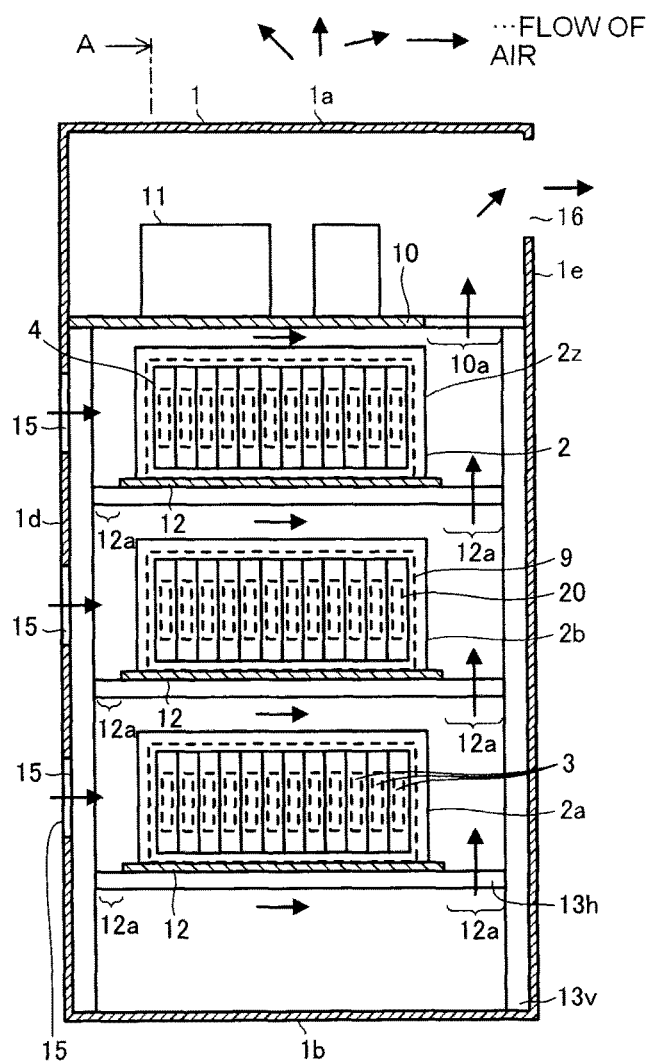
FIG. 3B is a side sectional view of the power storage device in FIG. 3A seen in a B direction.

As illustrated in FIG. 3A and FIG. 3B, the power storage device of the third embodiment has slots 20 in addition to the structures of the first embodiment (FIG. 1A, FIG. 1B).

In side surfaces of module cases 2, the slots 20 are provided at positions corresponding to respective batteries 3 housed in the module cases 2.

On opposite side surfaces of the module cases 2, heat transfer plates 9 are provided.

In this case, terminals of the batteries 3 are on an upper side.

When the heat transfer plates 9 are provided on both sides of each of the module cases 2, the slots 20 are provided also in the heat transfer plate 9 on the one surface.

In this third embodiment, since the slots 20 are provided in the side surfaces, of the module cases 2, which face the batteries 3 in a height direction of the batteries 3, so as to face the respective batteries 3, that is, since the slots 20 are provided in the side surfaces, of the module cases, which face side surfaces of the batteries 3, heat generated in the batteries 3 can be radiated from the batteries 3 through the slots 20 directly to horizontal flow paths which are passages of the air, without passing in the module cases 2.

Consequently, it is possible to reduce an overall heat transfer coefficient from the batteries 3 to the air in the casing 1.

As described above, according to this third embodiment, not only the effects of the first embodiment are obtained but also the overall heat transfer coefficient from the batteries 3 to the air in the casing 1 can be reduced owing to the slots 20 provided in the side surfaces of the module cases 2, which can reduce the temperature of the batteries 3.

Fourth Embodiment

Subsequently, a power storage device of a fourth embodiment will be described with reference to FIG. 4A and FIG. 4B.

Note that the same structures as those of the above-described first embodiment (structures illustrated in FIG. 1A and FIG. 1B) will be denoted by the same reference signs and description thereof will be omitted.

Figure 4A:
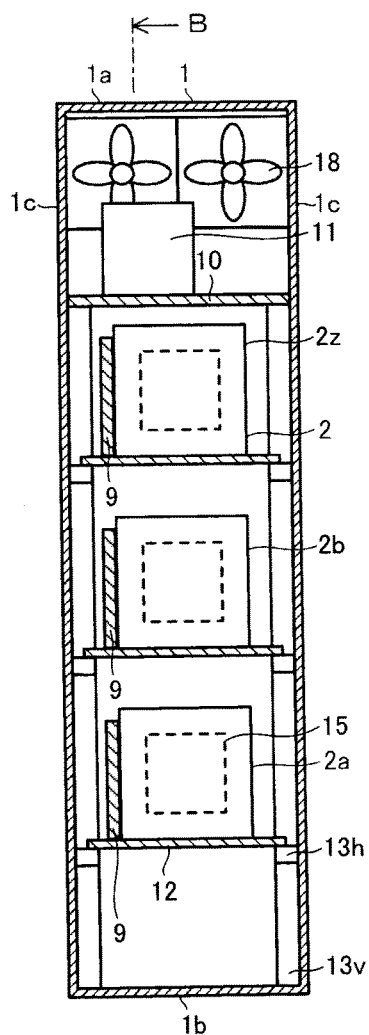
FIG. 4A is a front sectional view illustrating the structure of a power storage device of a fourth embodiment.
Figure 4B:
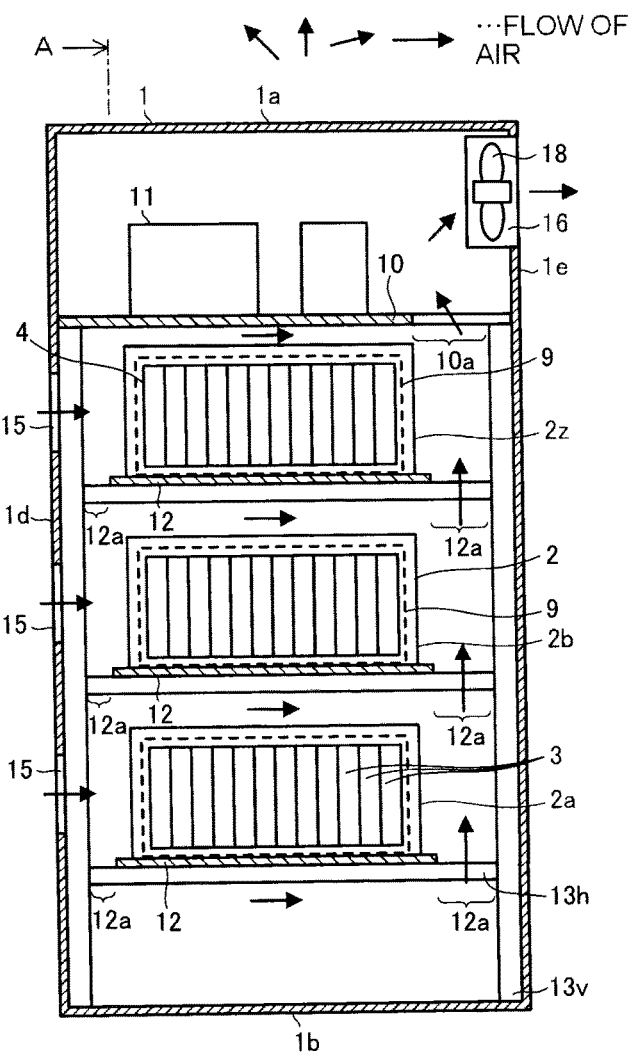
FIG. 4B is a side sectional view of the power storage device in FIG. 4A seen in a B direction.

As illustrated in FIG. 4A and FIG. 4B, in the power storage device of the fourth embodiment, an exhaust fan 18 is further provided (added) besides the structures of the first embodiment (FIG. 1A and FIG. 1B).

The exhaust fan 18 is provided in an exhaust port 16.

As a result of thus providing the exhaust fan 18 in the exhaust port 16, the air from under is sucked out to the exhaust port 16 through an opening 10a on a side of a top plate 10.

Owing to the provision of the exhaust fan 18, flow velocities of the air flowing into a casing 1 from air inlets 15 become very high in horizontal flow paths and vertical flow paths, and thus heat conductivity can be increased, which makes it possible to greatly reduce an overall temperature increase of batteries 3 housed in module cases 2a, 2b, 2z.

Incidentally, in this case, the position where the exhaust fan 18 and the exhaust port 16 are provided is not limited to an upper portion of the casing 1 but they may be provided at a plurality of positions of a rear side surface 1e facing a front side surface 1d where the air inlets 15 are provided, or may be provided on substantially the whole surface or on a top portion (corner portion) of the casing 1.

As described above, according to this fourth embodiment, not only the effects of the first embodiment are obtained, but also it is possible to reduce the overall temperature increase of the batteries 3 stored in the module cases 2a, 2b, 2z since the exhaust fan 18 is further provided (added) besides the structures of the second embodiment and accordingly the flow velocities of the air in the horizontal flow paths on upper sides and lower sides of the module cases 2a, 2b, 2z and the vertical flow paths become very high.

Further, temperature variation depending on the height positions of the module cases 2a, 2b, 2z (heat generating element groups 4) can be made smaller than in the second embodiment.

Fifth Embodiment

Subsequently, a power storage device of a fifth embodiment will be described with reference to FIG. 5A and FIG. 5B.

Note that the same structures as those of the above-described first to fourth embodiments (structures illustrated in FIG. 1A and FIG. 1B to FIG. 4A and FIG. 4B) will be denoted by the same reference signs and description thereof will be omitted.

Figure 5A:
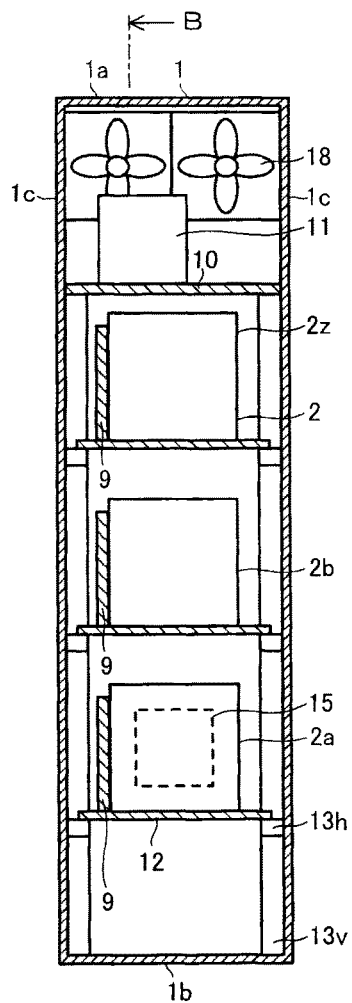
FIG. 5A is a front sectional view illustrating the structure of a power storage device of a fifth embodiment.
Figure 5B:
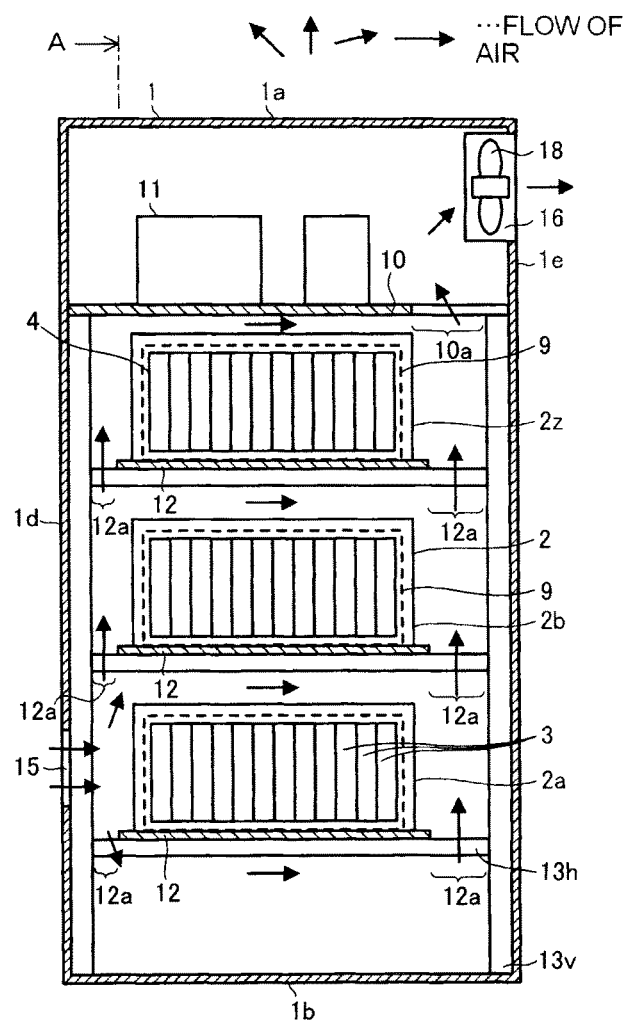
FIG. 5B is a side sectional view of the power storage device in FIG. 5A seen in a B direction.

As illustrated in FIG. 5A and FIG. 5B, the structure of the power storage device of the fifth embodiment is the same as the structure of the fourth embodiment except that an air inlet 15 is provided at one place.

In a front side surface 1d, the air inlet 15 is provided at a position corresponding to a height of a lowermost module case 2a.

In the fifth embodiment, the air inlet 15 is provided only at the position corresponding to the lowermost module case 2a out of module cases 2 arranged in tiers in a vertical direction, so that the air flows toward an exhaust port 16 from a lower portion of a casing and does not stagnate in the lower portion of the casing 1.

Consequently, the temperature of the lowermost module case 2a does become higher than that of the plural module cases 2 arranged in the vertical direction.

As described above, according to this fifth embodiment, since, in the front side surface 1d, the air inlet 15 is provided at one position corresponding to the lowermost module case 2a, the temperature of the lowermost module case 2a does not become higher than that of the plural module cases 2 arranged in the vertical direction, which can reduce temperature variation depending on the vertical positions of the module cases 2.

Further, as a result of thus providing the air inlet 15 in the lower portion of the front side surface 1d, the air flowing to horizontal flow paths leading to the module cases 2a, 2b, 2z smoothly flows owing to a negative pressure of an exhaust fan 18, which can improve cooling efficiency inside the casing 1.

Sixth Embodiment

Subsequently, a power storage device of a sixth embodiment will be described with reference to FIG. 6A, FIG. 6B, and FIG. 6C.

Note that the same structures as those of the above-described first to fifth embodiments (structures illustrated in FIG. 1A and FIG. 1B to FIG. 5A and FIG. 5B) will be denoted by the same reference signs and description thereof will be omitted.

As illustrated in FIG. 6A, FIG. 6B, and FIG. 6C, in the power storage device of the sixth embodiment, horizontal structural members 13h and vertical structural members 13v are hollow pipes (horizontal pipes 8 and vertical pipes 7), the pipes are joined so as to enable the passage of water in the pipes, connection portions of the pipes are hermetically sealed and end portions are sealed, a water inlet 5 as a liquid inlet is provided in a front side surface 1d, and a water discharge port 6 as a liquid discharge port is provided in a rear side surface 1e.

Further, the water inlet 5 and the water discharge port 6 are connected to a pump (not illustrated) for water passage by an external pipe, a hose, or the like, whereby water is passed through the pipes. The water inlet 5 is provided to pass a liquid from an outside into the pipes 7, 8 in the device.

The water discharge port 6 is provided to drain the liquid to the outside from the pipes 7, 8 in the device.

The horizontal pipes 8 are disposed in contact with shelf plates 12 on respective tiers.

Consequently, an overall heat transfer coefficient from the shelf plates 12 to the water flowing in the vertical pipes 7 and the horizontal pipes 8 can be made smaller than an overall heat transfer coefficient from the shelf plates 12 to the cooling air.

Note that the water may be a liquid such as an antifreeze liquid.

As described above, according to this sixth embodiment, since the water passage pipes are disposed so as to be in contact with the flow paths of the air and the shelf plates 12 to form a water cooling structure, the overall heat transfer coefficient from the shelf plates 12 to the water flowing in the vertical pipes 7 and the horizontal pipes 8 can be made smaller than the overall heat transfer coefficient from the shelf plates 12 to the cooling air, which makes it possible to diffuse a larger amount of heat of the module cases 2 to reduce the temperature of batteries 3 housed in module cases 2.

In the above-described embodiments, on the premise that the air inlet(s) 15 and the heat transfer plates 9 are combined, the structure additionally having the heat transfer sheets 19, the exhaust fan 18, or the slots 20, and the example where the structural members (support members) in the casing 1 are the water cooling pipes are described, but they may be combined in various manners.

For example, adding the exhaust fan 18 to the structure of the sixth embodiment (refer to FIG. 6A, FIG. 6B, and FIG. 6C) increases a flow rate of the air in the casing 1, so that the air passes at a high speed near the shelf plates 12 whose temperature is decreased by the pipes such as the horizontal pipes 8 and the vertical pipes 7, and accordingly the temperature of the air in the casing 1 decreases and the heat radiation of the surfaces of the modules is promoted, which can further decrease the temperature of the batteries 3.

Further, in the above-described embodiments, the examples where the module cases 2 are arranged on three tiers are presented, but the number of the tiers of the module cases 2 is not limited to three and may be two, or four or more.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A heat generating element housing device, comprising:
    a first side surface including a first air inlet to lead an outside air into an inside;
    a second side surface disposed to face the first side surface, including an exhaust port at an upper portion thereof;
    a first shelf plate provided at a position lower than the exhaust port, including an opening to send an inside air to the exhaust port;
    a second shelf plate having a heat transfer property, provided at a position higher than the first air inlet, the second shelf plate including an opening to send up the inside air led from the first air inlet;
    a module case in a substantially rectangular parallelepiped shape, including side surfaces having longitudinal side portions, the module case being fixed to the second shelf plate in a longitudinal direction thereof directed along a flow direction of the inside air, the module case housing a group of heat generating elements; and
    a highly heat conductive member having a heat transfer surface in contact with at least one of the longitudinal side surfaces of the module case and fixed with a side portion of the heat transfer surface being in contact with the second shelf plate to defuse a heat flow on each of the side surfaces of the module case and enlarge a heat radiation area to the inside air.

2. The heat generating element housing device according to claim 1,
    wherein the first side surface further includes a second air inlet at a position corresponding to the module case.

3. The heat generating element housing device according to claim 1, further comprising
    a heat transfer sheet disposed between the module case and the second shelf plate.

4. The heat generating element housing device according to claim 2, further comprising
    a heat transfer sheet disposed between the module case and the second shelf plate.

5. The heat generating element housing device according to claim 1,
    wherein the module case further includes an opening at each of the side surfaces of the module case so as to expose the respective heat generating elements in the module case.

6. The heat generating element housing device according to claim 2,
    wherein the module case further includes an opening at each of the side surfaces of the module case so as to expose the respective heat generating elements in the module case.

7. The heat generating element housing device according to claim 3,
    wherein the module case further includes an opening at each of the side surfaces of the module case so as to expose the respective heat generating elements in the module case.

8. The heat generating element housing device according to claim 1, further comprising
    an exhaust fan disposed in the exhaust port.

9. The heat generating element housing device according to claim 2, further comprising
    an exhaust fan disposed in the exhaust port.

10. The heat generating element housing device according to claim 3, further comprising
    an exhaust fan disposed in the exhaust port.

11. The heat generating element housing device according to claim 4, further comprising
    an exhaust fan disposed in the exhaust port.

12. The heat generating element housing device according to claim 1,
    wherein the first air inlet is disposed at a position of the first side surface, corresponding to the module case that is a lowermost module case.

13. The heat generating element housing device according to claim 3,
    wherein the first air inlet is disposed at a position of the first side surface, corresponding to the module case that is a lowermost module case.

14. The heat generating element housing device according to claim 4,
   wherein the first air inlet is disposed at a position of the first side surface, corresponding to the module case that is a lowermost module case.

15. The heat generating element housing device according to claim 5,
   wherein the first air inlet is disposed at a position of the first side surface, corresponding to the module case that is a lowermost module case.

* * * * *